United States Patent [19]
Sudheimer

[11] Patent Number: 5,964,451
[45] Date of Patent: Oct. 12, 1999

[54] WEED REMOVAL TOOL WITH ERGONOMIC PRESSURE HANDLE GRIP

[76] Inventor: Louis C. Sudheimer, 439 Portland Ave., St. Paul, Minn. 55102

[21] Appl. No.: 08/579,981

[22] Filed: Dec. 28, 1995

[51] Int. Cl.⁶ ....................................................... B66F 3/00
[52] U.S. Cl. .......................... 254/132; 81/177.1; 74/543
[58] Field of Search ................................ 254/132, 131.5, 254/DIG. 3; 16/121, 118, 111 R, DIG. 30; 56/DIG. 18; 74/543; 294/61; 81/177.1, 436

[56] References Cited

U.S. PATENT DOCUMENTS

| | | |
|---|---|---|
| D. 149,901 | 6/1948 | Olsen . |
| 176,811 | 5/1876 | Richards . |
| D. 189,796 | 2/1961 | Murray . |
| D. 202,772 | 11/1965 | Henry . |
| 207,667 | 9/1878 | Lovett et al. ............................... 74/543 |
| 347,054 | 8/1886 | Morse . |
| 1,021,672 | 3/1912 | Hart ......................................... 16/121 |
| 1,079,619 | 11/1913 | Walton . |
| 1,554,518 | 9/1925 | Ostrander . |
| 1,619,856 | 3/1927 | Davis . |
| 1,660,537 | 2/1928 | Waskom ................................. 81/177.1 |
| 1,867,086 | 7/1932 | Meixell . |
| 1,931,773 | 10/1933 | Sobol . |
| 2,141,072 | 12/1938 | Velepec ..................................... 81/436 |
| 2,164,373 | 7/1939 | Ayliffe . |
| 2,194,336 | 3/1940 | Tullio . |
| 2,251,587 | 8/1941 | Gagner . |
| 2,373,898 | 4/1945 | Kulesh . |
| 2,378,459 | 6/1945 | Beardsley . |
| 3,026,920 | 3/1962 | York ........................................ 81/436 |
| 3,065,015 | 11/1962 | Courtright . |
| 3,129,771 | 4/1964 | Lidstone . |
| 3,242,513 | 3/1966 | Janke . |
| 3,257,100 | 6/1966 | Helders . |
| 3,293,978 | 12/1966 | Handley ................................... 81/436 |
| 3,680,641 | 8/1972 | Hein . |
| 3,841,414 | 10/1974 | Perkins . |
| 3,847,226 | 11/1974 | Long . |
| 3,893,205 | 7/1975 | Anderson et al. ......................... 16/121 |
| 3,985,382 | 10/1976 | Wheeler . |
| 4,090,298 | 5/1978 | Rushforth . |
| 4,135,700 | 1/1979 | Arzoian . |
| 4,190,995 | 3/1980 | Rushforth . |
| 4,488,460 | 12/1984 | Ballone et al. ......................... 81/177.1 |
| 4,618,003 | 10/1986 | Hotstetter . |
| 4,673,165 | 6/1987 | Nelson et al. . |
| 4,723,802 | 2/1988 | Fambrough . |
| 4,832,132 | 5/1989 | Barcelon . |
| 4,977,800 | 12/1990 | Colvin ...................................... 81/436 |
| 5,005,888 | 4/1991 | Parks et al. . |
| 5,068,997 | 12/1991 | Plecki . |
| 5,188,340 | 2/1993 | Green . |
| 5,224,402 | 7/1993 | Pettersson ................................ 81/436 |
| 5,257,666 | 11/1993 | Townsend et al. . |

*Primary Examiner*—Timothy V. Eley
*Assistant Examiner*—Lee Wilson
*Attorney, Agent, or Firm*—Patula & Associates

[57] ABSTRACT

A weed removal tool is provided with an ergonomic handle shape which improves user comfort and reduces user fatigue and risk of injury. The handle is provided with a compound gripping surface which has been engineered and shaped to form a flattened egg-elliptical profile when viewed from the side, and a generally widened egg-shaped profile when viewed from the top or bottom. A strong, non-root cutting or severing, engineered shank is provided for gently loosening surrounding soil for removal of weed roots and is provided with a blunted tip for penetrating the soil without severing underlying roots. The shank is carefully engineered, shaped and proportioned to automatically relocate its operating fulcrum point so as to target, create, maximize and concentrate its soil and root loosening and lifting actions directly within the selected plant's root system. The handle is provided with a recess which is shaped complementarily to the shank and adapted to receive the shank therein, if made in separate parts or materials.

33 Claims, 11 Drawing Sheets

Figure 4
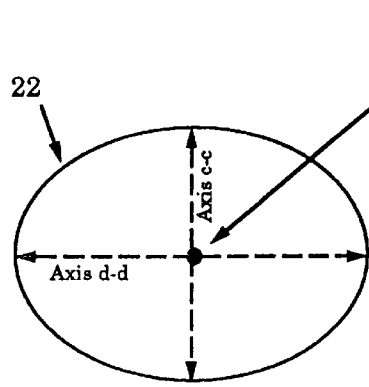
FIG. 4 a
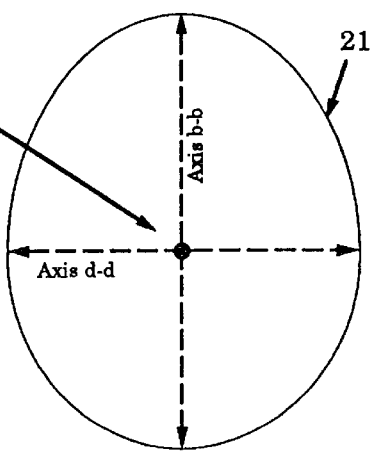
FIG 4 b
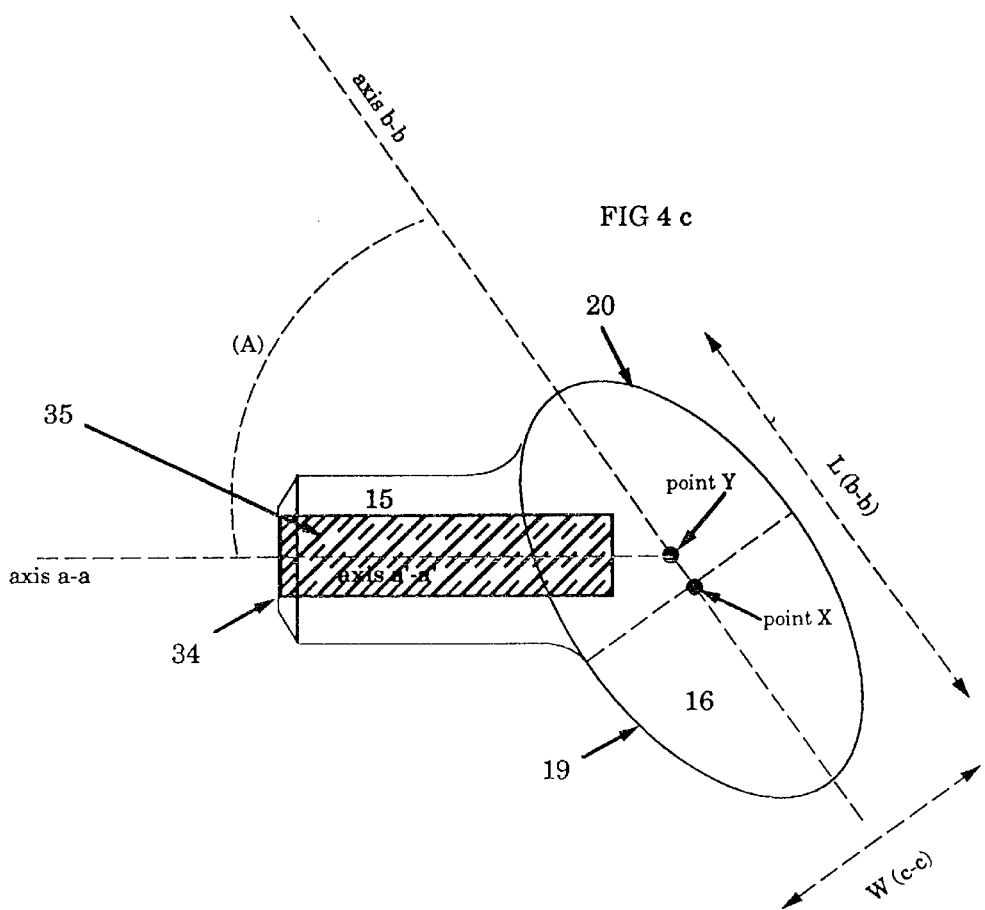
FIG 4 c

5,964,451

WEED REMOVAL TOOL WITH ERGONOMIC PRESSURE HANDLE GRIP

FIELD OF THE INVENTION

The invention relates to hand-held tools and improved ergonomic handles providing a gripping device for hand-held tools. The invention also relates to the field of hand-held tools and specifically to hand-held tools for the removal of weeds and/or other undesirable plants or for transplanting more desirable garden plants from one location to another without root injury.

BACKGROUND OF THE INVENTION

Gardening or weed removal is often tedious and tiring work. There are a wide variety of instruments to aid a person when gardening or removing weeds. However, many of these instruments, due to their designs, either result in fatigue, blisters or even pain to a user. Additionally, many of these instruments do not effectively and permanently remove unwanted weeds, damage plants being uprooted for relocation or replanting, or cause significant, noticeable and unsightly damage to the turf, garden bed or nearby desirable plants.

Prior art weed removal tools fall into several general categories:

1. Cutters which cut the weed above, at or below the surface;
2. Pryers which engage and try to extract the weed, similar to pulling a nail;
3. Claspers which clamp or grasp the weed with mechanical devices;
4. Diggers which normally dig into and/or remove portions of soil along with the weed;
5. Twisters which are inserted into the soil and are rotated to wrap around the roots which are thereby pulled and extracted; and
6. Chemicals which poison and/or interfere with the weed's internal biological life chemistry and kill it, in situ.

Often these devices are mechanically quite elaborate, have many parts that move, can break, and require maintenance, or they have parts that can clog during operation and which require cleaning and/or unclogging which normally requires the operator to stop and unclog or repair the device periodically.

The failure of many of these tools is often a result of poor or haphazard design. Exact angles, dimensions and radii, shapes and designs are extremely important to prevent fatigue or pain to a user and to prevent damage to the root system of plants so that they can be removed in whole, without damage to the turf, garden bed or other plants.

Numerous weed-removing devices have been disclosed in the prior art, but none to date have incorporated the unique features and simplicity of manufacture and use attainable with the instant invention.

For example, U.S. Pat. Nos. 1,619,856 to Davis, 1,931,773 to Sobol, and 2,378,459 to Beardsley disclose weed removal tools incorporating a V-shaped notch in the distal end of an elongate shank portion. The V-shaped structure adds to the complexity of the devices and to the cost of manufacture. Additionally, the V shaped blade or any blade-type device is designed to cut the roots of the weed beneath the soil surface, leaving a portion of the root in the ground. Mature plants frequently regenerate from the still buried and undisturbed cut off roots making these prior art devices irritatingly ineffective in permanently removing weeds and/or for transplanting desirable vegetation.

There have been attempts to design other prior art weed removal tools to loosen and upset the root systems of weeds without cutting them. U.S. Pat. No. 1,079,619 to Walton discloses a weed puller which is equipped with a pointed end for piercing the ground and a forked projection for gripping weed roots and lifting them upwards without disturbing surrounding plants. U.S. Pat. Nos. 1,867,086 to Meixell and 4,723,802 to Fambrough disclose devices which are inserted into the ground and turned to disrupt the root system and surrounding soil and then attempt removal of the weed and root system. However, such devices fail in their objectives and often tear the roots, especially if they are power driven. Additionally, such prior art devices lack simplicity in their construction. Consequently, manufacture of such devices is involved and relatively expensive. Moreover, the construction of such tools rely on projecting and/or mechanically moving parts to loosen weed roots and are subject to deformation or detachment during use. Cleaning also becomes a problem because soil deposits tend to accumulate around the projections and/or moving parts and are somewhat difficult or irksome to repeatedly remove and/or repair. Finally, chemical weed killers, although often effective, are now being shown to have multiple dangerous and adverse environmental and human side effects.

Additionally, the prior art weed removal tools are usually provided with handles or gripping surfaces which contribute to user fatigue and detract from efficient use of the tool. Various gripping devices have been incorporated into prior art weed removal tools. U.S. Pat. No. 2,164,373 to Ayliffe, for example, discloses a ball-shaped handle for a garden tool. Sobol, in U.S. Pat. No. 1,931,773, also discloses a handle having a ball-shaped portion and Perkins, in U.S. Pat. No. 3,841,414 shows a conventional wooden handle having an elongated bulb shape. Such handle designs, however, tend to concentrate forces on small portions of the user's hand during use of the tool—increasing the likelihood of fatigue and even injury during repeated use.

Ergonomic handles have been disclosed in prior art fields relating to rotating tools including wrenches. For example, Ballone, et al. in U.S. Pat. No. 4,488,460 disclose an ergonomic handle shape that incorporates an ellipsoidal gripping surface for a hand ratchet-type socket wrench. However, unlike the present invention, the gripping surface of Ballone, et al. has the identical ellipsoidal shape when viewed from the top, bottom, and sides, and as a result, tends to concentrate the dominant forward forces along a relatively narrow area of the user's hand, i.e., the top of the ellipsoidal surface, thereby allowing for fatigue, blistering or pain therealong. Additionally, Ballone, et al. do not address or solve the prior art problems in the weed removal arts as discussed above.

OBJECTS OF THE INVENTION

It is an object of the instant invention to provide an ergonomic handle structure for a hand held tool which reduces fatigue, increases user safety and comfort, facilitates all needed motions and actions and is designed to comfortably and effectively accommodate and precisely direct the powerful and repeated manual force applications often required for effective tool use, for example in weed and plant removal.

It is another object of the invention to provide a weed removal tool that is consistently simple in its construction, inexpensive to manufacture, and easy to use and clean.

It is still another object of the invention to provide a weed removal tool that is more effective in removing weeds and the root systems associated therewith than prior art devices.

It is yet another object of the invention to provide a weed removal tool for removing the entire weed from the ground while causing minimum visible turf disruption.

It is a further object of the invention to provide a weed removal tool that does not cut or damage either the roots or the root tendrils, but rather, after the soil fracturing, loosening, displacement and lifting actions of the invention, allows substantially the entire root's system to be removed, substantially intact, so that the plant absolutely cannot regenerate itself or can be successfully transplanted.

It is an additional object of the present invention to provide a relatively simple, inexpensive and efficient tool which in addition to not cutting, tearing or breaking the roots, also does not remove any soil, does not leave any permanent holes, does not damage adjacent plants, and has no movable or mechanical parts to wear out, clog or require maintenance.

It is yet another object of the invention to provide a weed removal tool for successfully and repeatedly removing essentially the entire weed from the ground while causing minimum visible turf or lawn disruption, and which also allows the disturbed sod to be simply and immediately repositioned and to continue both living and growing.

These and other objects of the present invention will become apparent to those skilled in the art after considering the following description together with the accompanying drawings and claims.

SUMMARY OF THE INVENTION

The above objects and others are achieved by a unique weed removal tool configuration which comprises an elongate shank thoughtfully proportioned and engineered for quickly and easily leveraging, loosening and dislodging a weed's or plant's entire root system and which is equipped with an ergonomically designed pressure handle for comfortably gripping and effectively controlling the tool shank.

The generally rounded shank, deliberately devoid of any sharp edges or projections, is provided with a purposefully bluntly-pointed tip and shape that allows the tool to be inserted into the ground proximate to but not necessarily even touching, and definitely not cutting and ideally not even damaging the target plant's root structure. The smooth edges and generally rounded profiles of the variously-shaped shank(s) for the tool are designed such that when in use, the ground around and immediately adjacent to the root system is caused to be relatively gently disrupted so as to release the roots of the target plant without necessarily engaging them, and generally without tearing or cutting them, thereby allowing substantially all of the root structure to be is removed in order to absolutely prevent regrowth.

In operation, the user grasps the device by the handle grip and selects an insertion point on the ground surface surrounding the weed or plant desired to be removed. If necessary, the soil may be softened by soaking with water prior to using the tool. The insertion point is preferably chosen to be a radial distance from the weed center approximately equal to the plant's diameter. The user then inserts the tool point into the soil at an angle of between 45 and 60 degrees from the horizontal ground and forces the tool's tip and shaft into the soil by grasping and applying force to the ergonomically-designed pressure handle grip.

The blunted point and steeply initially angle tip, allows the soil around the roots and even the roots themselves to be engaged, pushed gently aside and loosened by the tool while still minimizing the potential for the roots to be severed. Although bluntly pointed, the widely-angled, small, triangular tip at the forward end of the more gently tapered distal zone still permits easy insertion of the tool into the soil. The tool is inserted to a distance at which the tip proximates and/or matches the root system's estimated depth, usually ½ to ⅔ of the shaft's length as shown in FIG. 7.

The shaft then engages and/or dislodges the weed roots, without severing them, via the user initially applying a downward soil fracturing and pulverizing leveraging force on the handle using the thickest portion of the shank's shaft as a lever against a self-created temporary compressed-soil-fulcrum adjacent the thick portion of the shaft. The fulcrum in turn reverses and then leverages the tool's distal tip end upward, thus initiating opposite and upwardly leveraged soil fracturing, pulverizing and upwardly lifting root disruptive actions from the tapered and narrowed tip portion of the shank under and within the target plant's entire root system.

The comfortably angled design of the handle with respect to the shank axis in combination with the flattened egg-ellipsoidal shape of the palm-conforming handle grip provides a stable and effective control platform for the human hand, wrist and forearm throughout the forceful straight ahead insertion and the initial strong downward leveraging motions. The compact construction and shape of the ergonomic grip permits the user's hand to easily readjust and regrip on the handle after insertion to quickly and fluidly lever the shank downward to a position where it is almost parallel with the ground surface.

Next the user smoothly inserts the tool tip horizontally straight forward two or three inches further, thereby embedding the thicker part of the shaft more deeply directly under the weed, and then quickly and fluidly levers the handle and shaft back upward, preferably at a slight angle to either the left or right toward the plant's center, in a lifting motion which heaves up and raises or humps the entire area, including the turf or lawn grasses, surrounding the weed.

At this point, the user grasps the base of the weed stalk/stem with his or her free hand under the leaves at, or just slightly below, the ground surface at the very top of the root system (known as the "root collar"). The user should not try to pull or extract the weed at this point if it does not freely exit the ground, as one may very likely break off large portions of the root. Rather, it is generally best to just apply a steady and continuous, but gentle upward finger pressure, until the tool's next soil leveraging actions release the roots.

The user then begins a gentle back and forth wiggling or circling of the tool shank to easily apply various trajectories of soil fracturing and pulverizing actions within the soil adjacent to and still clinging to the weed's root system. This usually will loosen the remaining soil surrounding the roots enough to enable the user's fingers to instantly sense when the roots are released, at which time the user can gently lift and extract the entire root system and intact plant from the soil.

These few, simple motions, the precise implementation of which may be varied as necessitated by nearby obstructions, ground slope, and/or soil obstructions, etc., are easily, comfortably and quickly accomplished owing to the ergonomically coordinated shape and design of the handle and the engineered inter-related proportionate shapes and design of the shank. Additionally, when occasionally necessary, the tool may be removed and reinserted in the ground at another position, for example at approximately 90 degrees from the initial insertion point, to further loosen the roots from the surrounding soil and/or the lawn's turf. Eventually, the roots are loosened and released by the tool and the freed weed or plant is removed with its entire root system substantially intact by simply lifting it out with the user's other hand.

The above simple sequence of weed root removal motions, need be practiced only a few times, and the user quickly and easily finds the invention's use fluid, effective and surprisingly quite satisfying.

The ergonomic handle has been provided with a gripping surface that has a widened egg-shaped profile when viewed from the front, rear and top/rear angular directions and a flattened egg-elliptical profile when viewed in either lateral direction. Depending upon the tool's function, the longitudinal major axis of the egg-shaped portion of the handle should be angularly oriented within a range between a forty (40) and a seventy (70) degree angle from the central longitudinal axis of the tool shank. In addition, again depending upon the tool function envisioned, the longitudinal axis of the tool shank can pass through the major axis of the egg-shaped portion of the handle either above or below the central point of intersection of the major and minor axes of the egg-ellipsoidal portion of the ergonomic hand grip.

Laterally a cross section of said generally flattened egg-ellipsoidal grip's side-profile should have a minor axis of 55% or less than that of its major longitudinal axis. Whereas from the front or rear cross-sectional views, the widened egg-shaped grip profile would have a minor axis of 65% or more than that of its major longitudinal axis. The resultant flattened egg-shaped side profile combined with the widened front, rear, and top/rear profiles increases the force-transmitting area of the handle and closely approximates the natural pressing shape of an average human palm when it is transmitting substantial straight forward pressure forces to the handle and shank and thus increases comfort and reduces fatigue. The comfortable and appropriately-angled handle thus facilitates user comfort during periods of extended and/or repeated use and also allows quick and easy, as well as controlled and effective manipulation and direction of the tool.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein:

FIG. 4a is an end view of the handle of FIG. 4 as seen in the direction of Axis b—b of FIG. 4c;

FIG. 4b is a top/rear view of the handle of FIG. 4 as seen in the direction of Axis c—c of FIG. 4c;

FIG. 4c is a side view of the ergonomic handle according to a preferred embodiment of the present invention;

DESCRIPTION OF THE PREFERRED EMBODIMENTS

Figure 1:
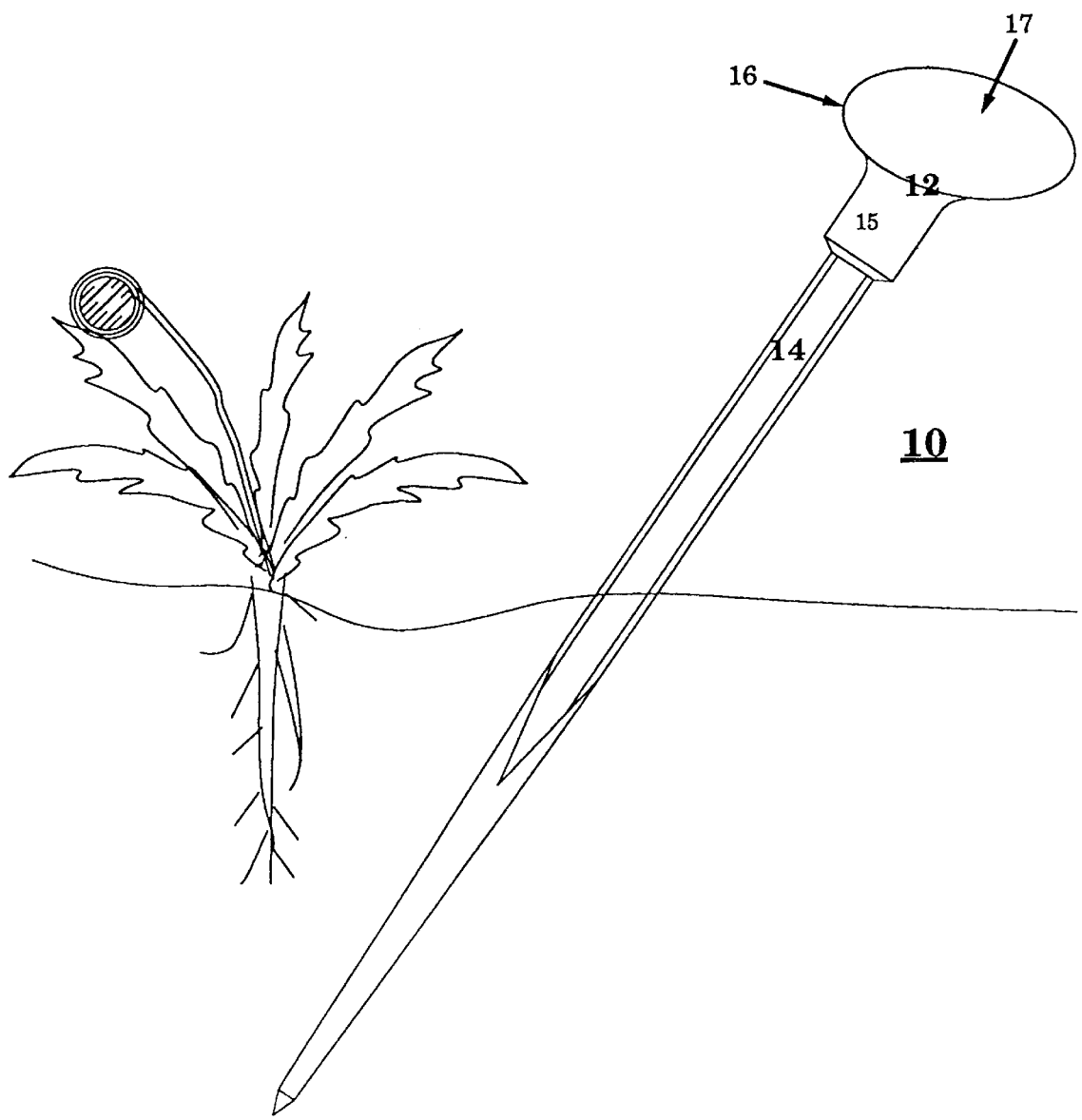
FIG. 1 is a view showing a preferred embodiment of the present invention being used in a weed removal operation.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or the claims of the embodiment illustrated.

Referring to FIG. 1, reference numeral 10 represents a weed or plant removal tool constructed according to the present invention. The tool is generally comprised of a handle 12, and a shank 14 connected to the handle 12. The tool is preferably manufactured from lightweight, yet strong, material or materials.

As can best be seen within FIG. 1, the handle 12 is designed to control a shank 14 mounted within and guided via a neck portion 15 and also comprises an ergonomic grip shape 16 and gripping surface 17 designed and formed into a modified egg-shaped compound ellipsoidal configuration. The flattened, egg-shaped profile on the top portion of the handle increases the surface area in contact with the user's hand as compared with prior art ergonomic handles and is contoured in harmony with the natural pressing and gripping shape of the human palm and hand. The egg-shaped profile spreads and more evenly distributes the concentration of forces, especially straight ahead longitudinal forces, against the user's hand and reduces fatigue and risk of injury as well as increases the operator's control and effectiveness.

Figure 2:
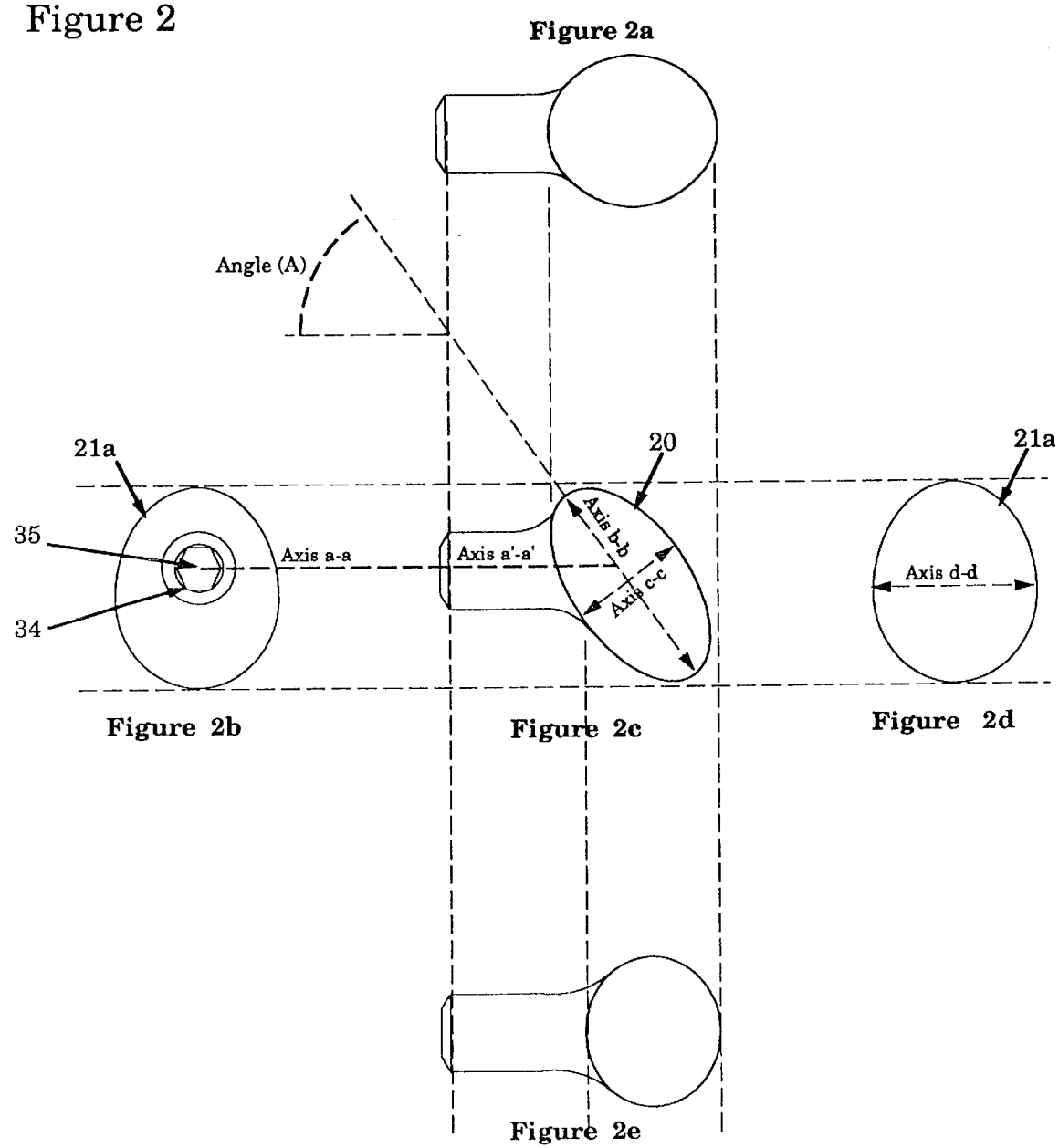
FIG. 2 depicts front (FIG. 2b), rear (FIG. 2d), side (FIG. 2c), top (FIG. 2a) and bottom (FIG. 2e) views of the ergonomic handle according to the present invention.

Referring to FIG. 2, handle 12 includes an ergonomically shaped gripping surface 16 having a lateral cross-sectional profile that is generally shaped as a narrowed, i.e., flattened, egg-ellipse 20 (FIG. 2c) when viewed from the side. The side, or lateral, view is defined as either of the two opposite views which are simultaneously perpendicular to, i.e., normal to, both axis b—b and axis a—a, the shank axis. The flattened-egg ellipse 20 profile has a major axis b—b and a minor axis c—c. The ratio of said minor axis c—c to said major axis b—b should be 60%, or less. In this preferred embodiment said ratio is approximately 57%.

Rotating ninety (90) degrees around said major axis b—b, and referring next to the top/rear angular cross-sectional view of the grip 16 portion of said handle 12 (see FIG. 4b), one sees another cross-section of the ergonomically-shaped grip 16 having a cross-sectional profile (Ellipse 21) that is shaped in a modified i.e., widened, egg-shaped ellipse 21 when viewed from the top/rear angle and also appears somewhat similarly widened, when viewed longitudinally along axis a—a, from either the front or rear views (see Ellipse 21a, FIGS. 2b and 2d). This ellipse 21 profile also has the same shared major axis b—b but a different minor axis d—d which is perpendicular to profile 20's minor axis c—c. The ratio of said minor axis d—d to said major axis b—b should be 65%, or greater. In this preferred embodiment, said ratio is approximately 77%. In addition, the egg-shaped compound ellipsoidal portion of the ergonomically shaped grip 16 of handle 12, i.e., without the neck 15 portion, when viewed in cross-section longitudinally directly down axis b—b, is thereby preferably formed substantially as yet another flattened compound ellipse (Ellipse 22, FIG. 4a), this one around said major axis b—b. Thus, grip 16 has three central axes, the major longitudinal b—b, the vertically normal minor c—c and the horizontally normal minor d—d. All three are mutually perpendicular to each other and thus all mutually intersect at only one point, Point X.

Handle 12 is also provided with a flared neck 15 to house shank 14 or other possible tool shank configurations and/or uses. Neck 15 extends and narrows from gripping surface 16 with the neck axis a'—a' forming an acute angle (A) with the major axis b—b of the compound egg-shaped ellipse(s) which together form the main ergonomic gripping portion 16 of the handle 12. The inventor has found that said acute angle (A) may comfortably range between forty and seventy (40 & 70) degrees depending upon the purpose(s) for which the handle and shank are to be employed. In this preferred embodiment, the said acute angle (A) shown is fifty-five (55) degrees. For perspective, if one orients both the longitudinal axis a—a of the shank 14, and the identically aligned neck 15 axis a'—a', so that both are pointing North on a compass, toward zero (0) degrees, then major axis b—b within the ergonomically egg-shaped gripping surface 16 portion of the handle 12 grip in this embodiment will be pointing ENE at fifty-five (55) degrees.

In addition, as shown in FIG. 4c, the two central, and coincidental, axes (i.e., a—a and a'—a', of shank 14 and neck 15 respectively), pass through axis b—b at a Point Y. Point Y may be located anywhere along axis b—b up to a maximum of 33% (of axis b—b's length) either above or below axis b—b's geometric midpoint (Point X). Point X is also the point of intersection of the mutually perpendicular minor c—c and d—d axes of the angled, compound egg-ellipsoidal grip portion 16 of the ergonomic handle 12.

Figure 6:
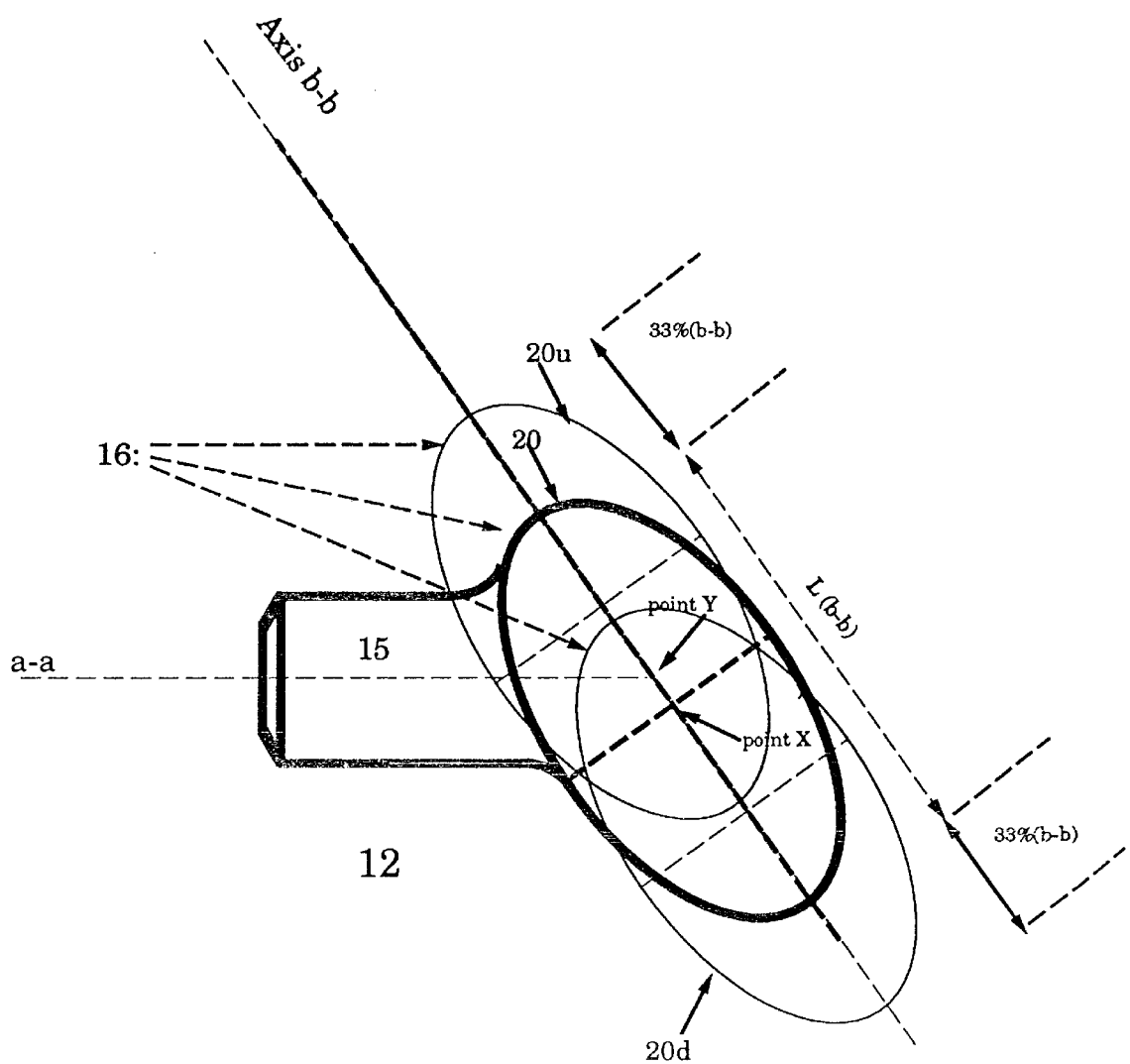
FIG. 6 is a side view of the handle of FIG. 4 illustrating the functional range of location of grip along axis b—b.

Depending upon the final tool shaft function envisioned, as described above and shown in FIG. 6, the shaft a—a axis intersection point, Point Y, can be safely shifted either 33% above or below Point X along handle 16's axis b—b not only without adversely affecting tool performance, but in many cases actually enhancing it, as in the preferred embodiment wherein Point Y has been sited approximately 10% above Point X.

Neck 15 and gripping surface 16 may be constructed as a single piece being homogeneously comprised of the same material throughout both the neck and grip. Gripping surface 16 may be provided with a surface texture 17 such as stippling or a composition and/or surface modification or material intended to increase or decrease friction between the surface 17 and a user's hand, depending upon what is required for various shaft end uses or purposes.

As best seen in FIGS. 2 and 4, neck 15 includes a recess 35 which is adapted to receive and retain shank 14. Recess 35 is shown constructed as a hex-shaped aperture, but may be constructed in any transverse profile shape (see FIGS. 3a–e for some examples) with appropriately rounded edges larger than a minimum radius (R), and which provides an operative connection in concert with the shape of any said shank 14 selected. Handle 12 is preferably constructed of a high-strength, impact-resistant plastic, for example polypropylene, and may be injection-molded as a single piece with a friction fit for shank 14 or fabricated as two portions which are attached together by adhesive, thermal bonding or other methods to encase the shank 14 and/or neck 15. The handle 12 may also be constructed of wood or other suitable materials. Additionally, the entire tool, including the handle 12 and shank 14 may be constructed as a single, homogenous piece which is cast, molded or fashioned in a single or multiple operation from one material.

Figure 5:
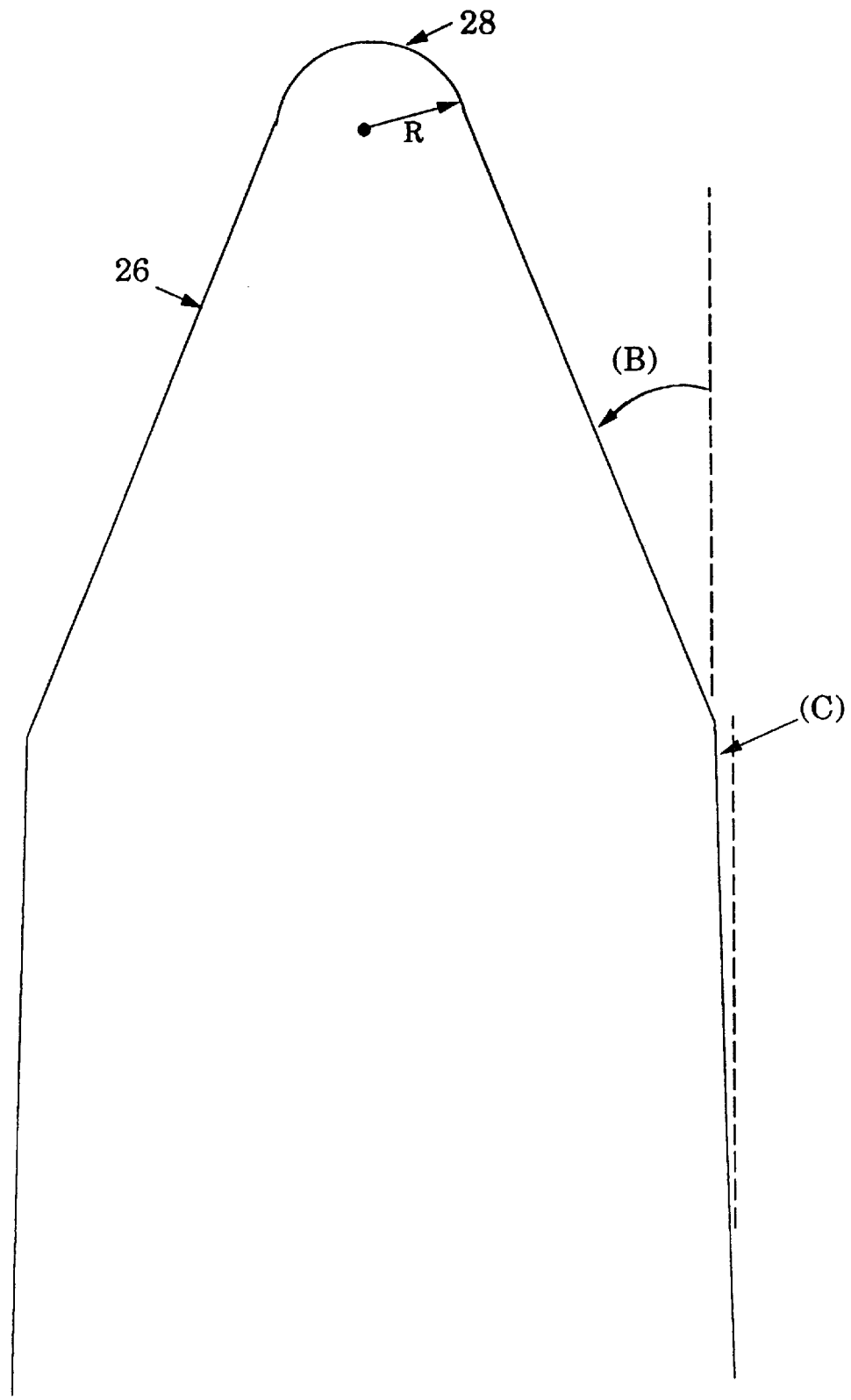
FIG. 5 is an enlarged view of the blunted point and the angled tip of a preferred embodiment of the present invention.

As shown in FIG. 5, point 28 is preferably provided with a radius (R) of 0.0150 inches or larger. In the preferred embodiment, 0.0156 inches has been found by the inventor to be sufficient to ensure that point 28 in conjunction with tip cone 26 (FIG. 3) will easily penetrate into the soil surrounding the weed and yet normally dislodge or push aside, rather than sever, any root portions when it encounters and/or engages them.

Shank 14 is preferably constructed of a high-strength moisture and/or corrosion-resistant material and may be of any reasonable traverse cross-sectional profile (see FIG. 3) including but not limited to star-shaped, x-shaped, round, hex, triangular, square, or polygonal, etc., so long as no profile edge is comprised of adjacent contiguous planes which intersect at an angle of less than 100 degrees, and/or if curved, the radius of such arc shall be no less than (R).

Shank 14 may be fabricated in either solid or hollow shapes. Generally rounded shank shapes are preferable, but the angular shapes and edges mentioned or illustrated are most acceptable for the purpose intended so long as any angled edges meet at a minimum of a 100 degree angle and any curved edges have a rounded radius (R) of 0.0150" or greater so as not to unnecessarily damage or sever roots or root tendrils. In the preferred hex embodiment, the six contiguous traverse planes meet at 120 degrees. Shank 14 may also be constructed of an appropriate high-strength, bending and impact resistant plastic.

Figure 3:
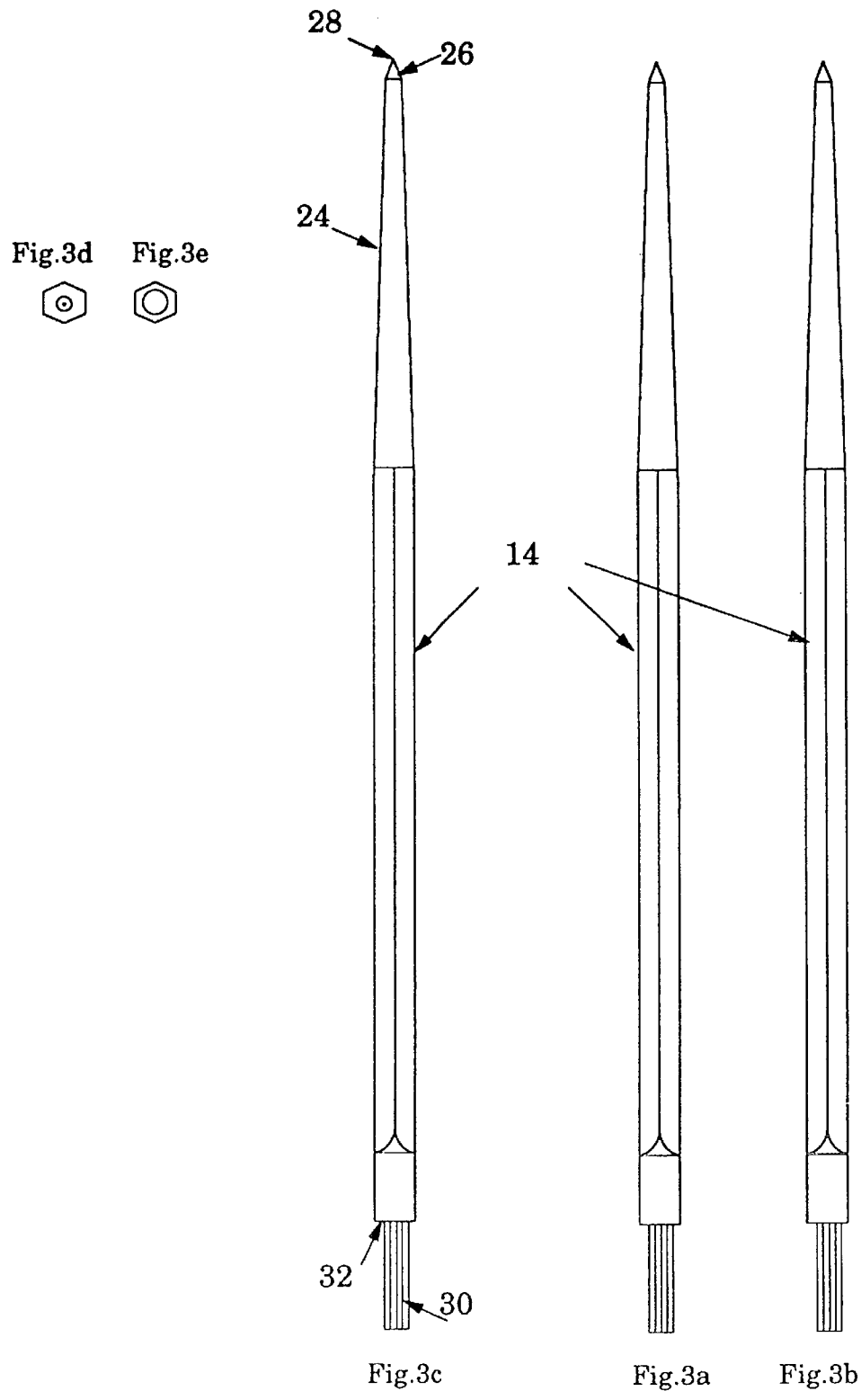
FIG. 3 depicts front (FIG. 3a), rear (FIG. 3b) and side (FIG. 3c), top (FIG. 3d) and bottom (FIG. 3e) views of the shank for a preferred embodiment according to the present invention.

Referring to FIG. 3, shank 14 includes a narrowing portion 24 (see FIG. 7, zone 14a) which gradually either curves or tapers into a tip cone 26 and then a deliberately blunted but still soil penetrating point 28 at the distal end of the shank 14. Preferably, said tapered portion 14a is provided with at least an average of a one degree taper with respect to both the generally parallel sides or edges of the remainder of the shank and to axis a—a. Tip cone 26 is provided with a point 28 which is blunted to prevent the piercing or severing of the root portions of the weeds or plants to be removed while still allowing easy insertion into surrounding soil.

Shank 14 may be provided with an attachment portion 30, example shown in FIG. 3, which may be in any appropriate shape to provide a suitable connection to the handle. Handle 12 is provided with a complementarily-shaped recess which receives the attachment portion 30 so as to prevent relative rotation between the shank 14 and handle 12.

A shoulder 32 is formed between any narrowed portion 30 and the shank 14. Neck 15 is provided with an end face 34 which abuts the shoulder 32 when attachment portion 30 is fully inserted into the handle recess 35. Alternatively, any conventional fastening implements, shapes, or techniques may be employed to effectively fasten the handle and the shank to each other.

In operation, the user grasps the device by the handle 12 and selects any convenient insertion point located axially one radius outside of the target plant's average circumference on the soil surrounding the weed or plant desired to be removed.

Figure 7:
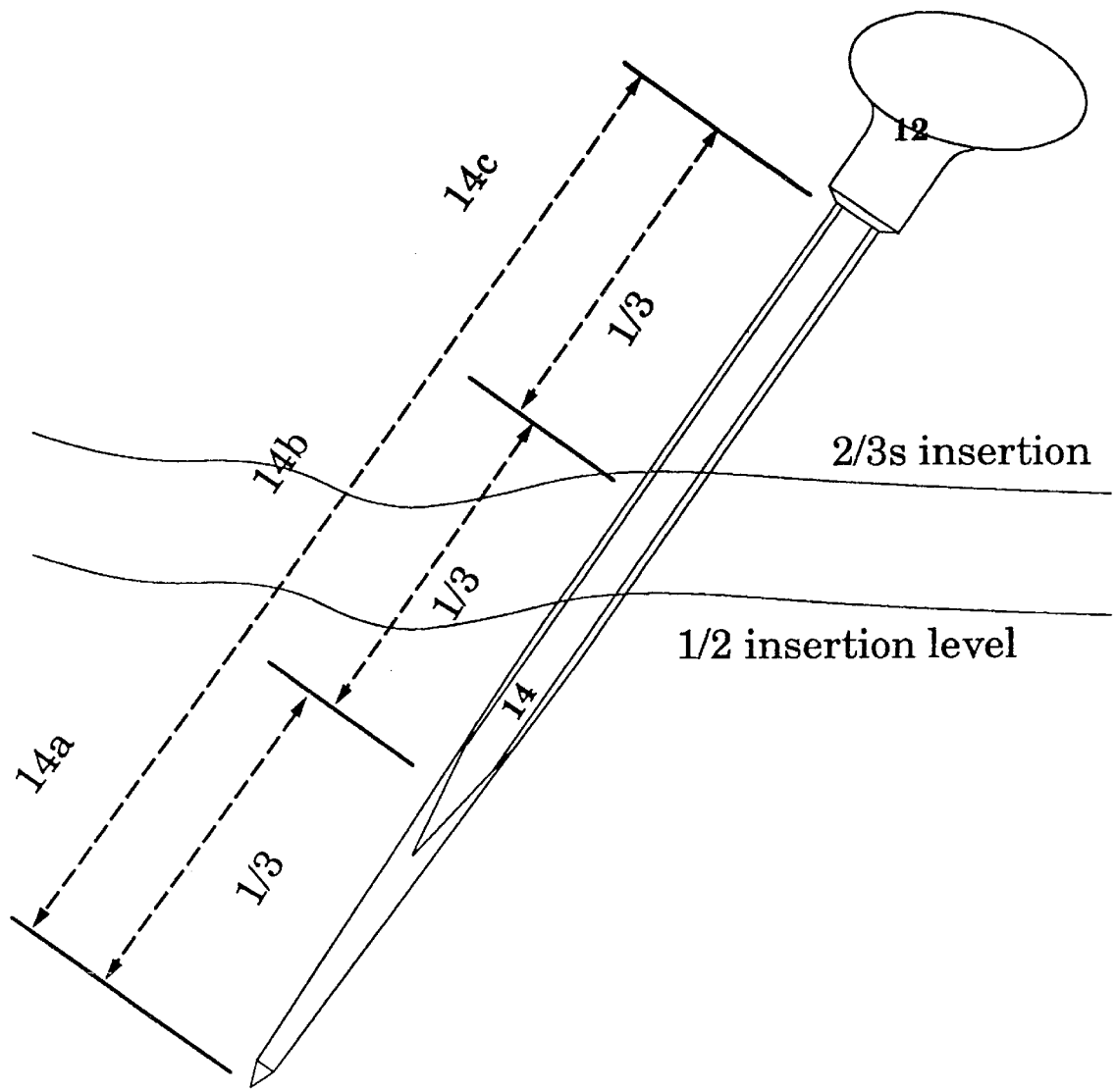
FIG. 7 is a view showing the insertion of the preferred embodiment of the invention into the ground.

For the purposes of the following explanation, divide the exposed longitudinal shank 14 portion of the tool 10 into three zones lengthwise, as per FIG. 7, the lower (distal or tip end) is designated as zone 14a, the middle zone as 14b, and the upper (nearest the handle or proximate) as zone 14c. The designed shapes, placement and relative ratios of the cross-sectional surface areas of the three zones or one-third segments of the exposed shank 14 of the tool 10 are engineered to cooperate to self-regulate and direct the shaft tip zone 14*a* during the leveraging actions and to magnify the tip 14*a* zone's relative motion so as to steer, concentrate and multiply the distal tip zone's and the shaft's rotational and lifting movements, thus concentrating its soil disruptive and loosening actions and effectiveness, within the target plant's root zone.

For optimal performance, the tool shaft 14 is designed and fabricated so that the gross longitudinal cross-sectional surface area of the shank's tapered and pointed distal ⅓ zone 14*a* should be between 25% and 85% relative to the middle 14*b* ⅓ zone's 100% longitudinal cross-sectional surface area. In this preferred embodiment said ratio is approximately 72%.

It should be noted that the foregoing ratio range is true irrespective of which of the various possible shank 14 transverse profiles (see FIG. 3) has been selected. However, due to the multiplicity of possible transverse profiles, care must be used to insure that actual effective in situ widths, thicknesses or diameters are selected to calculate the zoned longitudinal cross-sectional areas and proportions in order to be certain that the desired tip zone leveraging is actually attained.

Figure 8A:
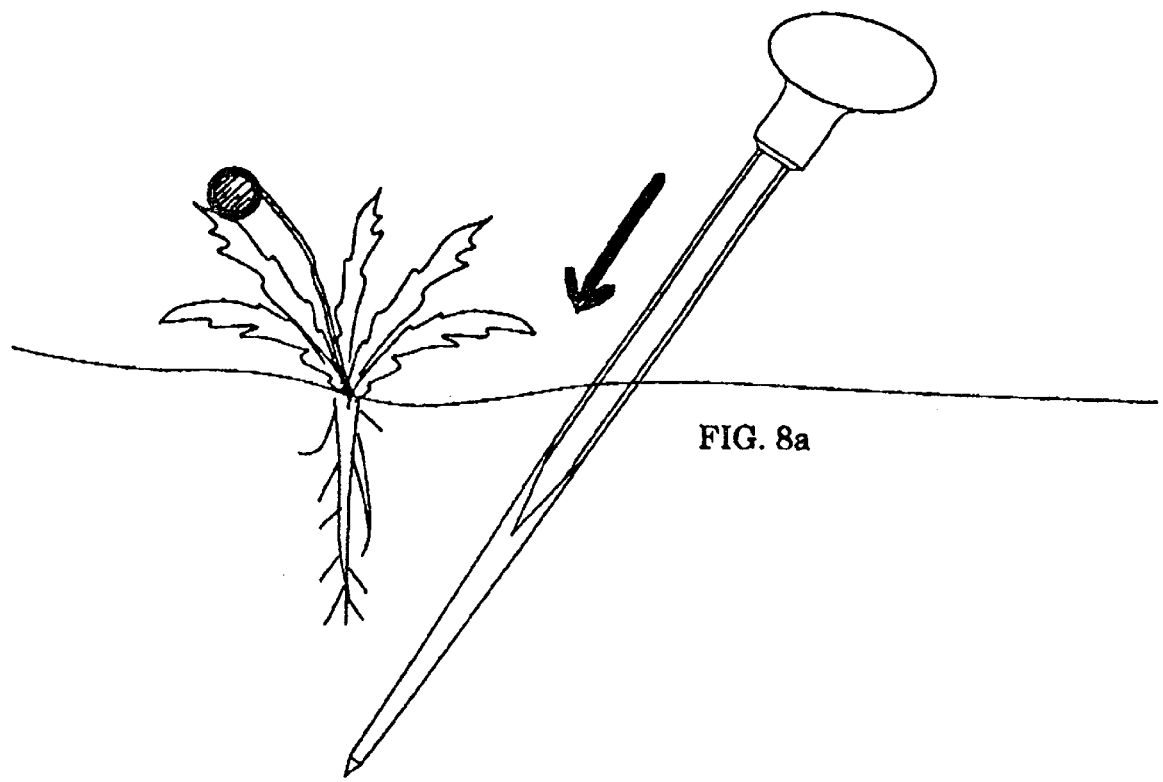
FIGS. 8a through 8h are a sequential series illustrating one technique of extracting a weed using the preferred embodiment.

If necessary, the ground may be softened by soaking with water prior to using the tool. The insertion point is preferably chosen to be a radial distance from the weed stalk/stem approximately equal to the plant height or greatest lateral width (from leaf tip to leaf tip), whichever is greater. The user then inserts (see FIG. 8*a*) the tip 26 into the soil at an angle comfortable to the position of the user but generally of somewhere between 45 to 60 degrees to the horizontal ground and penetrates the steeply angled tip 26 and more gently tapered shaft zone 14*a* into the soil by gripping and applying force to the ergonomically designed pressure handle grip 12.

The shank 14 should be inserted to a depth of anywhere between ½ and ¾ of its exposed length (a ⅔ insertion is generally optimal) into the earth at an appropriately user comfortable angle within the range just described.

The blunted point 28, and deliberately steeply angled (B) tip cone of isosceles triangle 26 allows the soil around the roots and even the roots themselves to be gently engaged, pushed slightly aside and loosened by the tool while minimizing or eliminating the potential for the roots to be severed or torn. The angle (B) of tip cone 26 can range between 10 and 40 degrees without tearing the root stems they accidentally engage, although in this preferred embodiment a 20 degree angle is used. Although blunted at 28, the twin combination of the steeply angled tip cone 26 at the forward end of the more gradually tapered distal zone 14*a* still permits easy insertion of the tool into the soil. The more gently tapered angle (C) representing the major portion of zone 14*a* should be angled 1% or more from axis a—a. In the preferred embodiment, said angle is 2%.

Figure 8B:
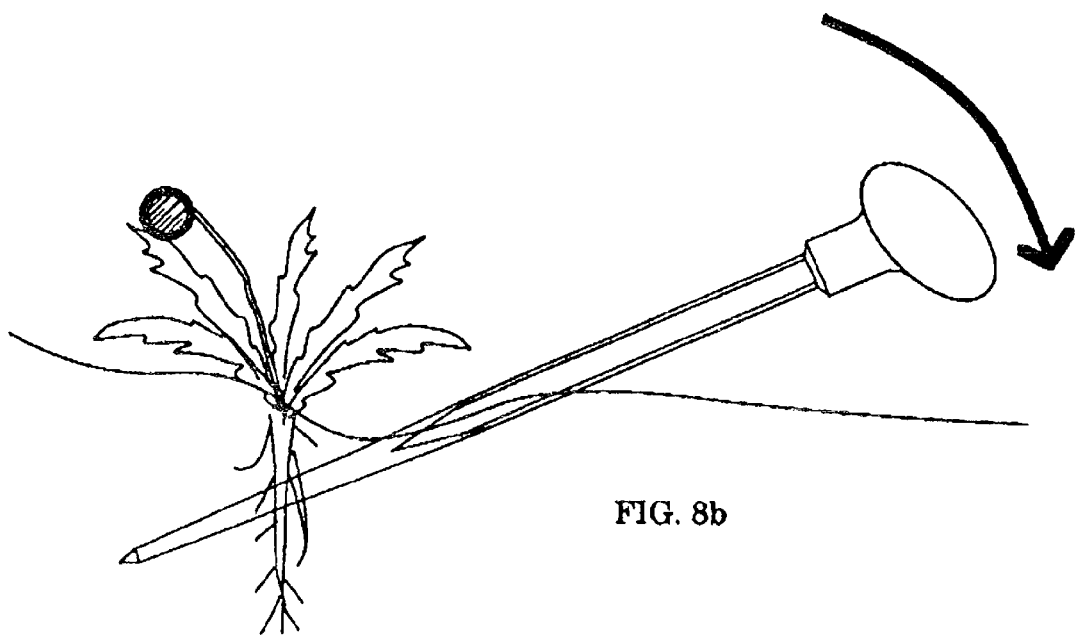

As the user next applies initial downward leveraging force (see FIG. 8*b*) to the shaft 14 via handle 12, the proportionately thicker middle zone 14*b* and then sequentially and additionally increasing portions of the upper zone 14*c* of the shank both depress and compress the adjacent soil until it becomes a temporary fulcrum. At this point, the soil's gradually increasing resistance to further compression automatically shifts the effective fulcrum point further and further up the shank. This decreases the tip 14*a* zone's effective relative cross-sectional surface percentage (i.e., resistance to the tip 14*a* zone's movement through the soil) more and more in favor of greater, and opposite, relative movement of the tip 28 vis a vis the handle 12 and also targets the tip 14*a* zone's opposite relative movement in a more upwardly directed trajectory, and thus initiates a leveraged and lifting, rotational arc of the tip 14*a* zone of the tool right under the plant.

Thus the shaft's 14 integrally engineered design of zoned, proportional cross-sectional surface area inter-relationships (14*a*=72% of 14*b* in the preferred embodiment) automatically guides and concentrates the tool tip's upwardly lifting soil disruptive and loosening actions exactly within the target root system, right where it is desired. In order to obtain the desired soil compression and fulcrum compaction, shaft 14's average transverse width horizontally in zone 14*b* and the lower half of 14*c* must be at least 0.250". In the preferred embodiment said width is 0.500".

Figure 8C:
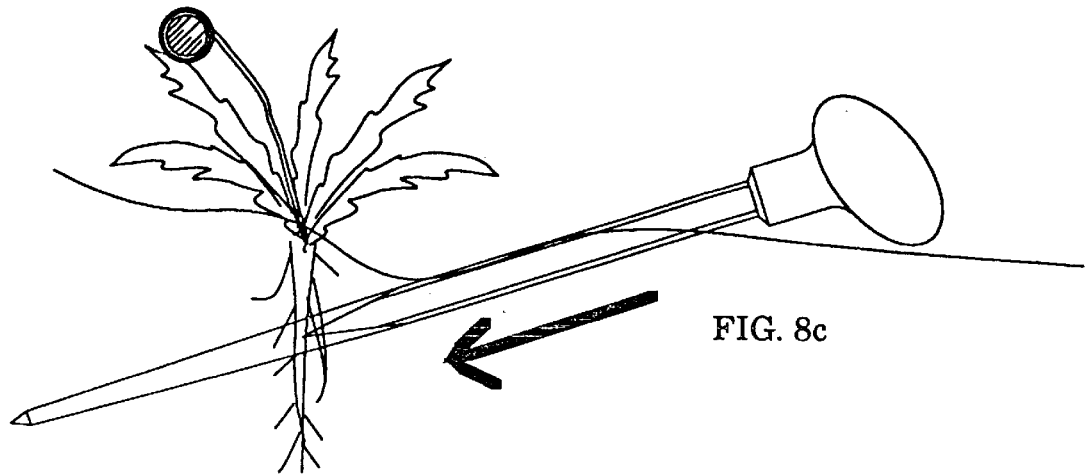
Figure 8D:
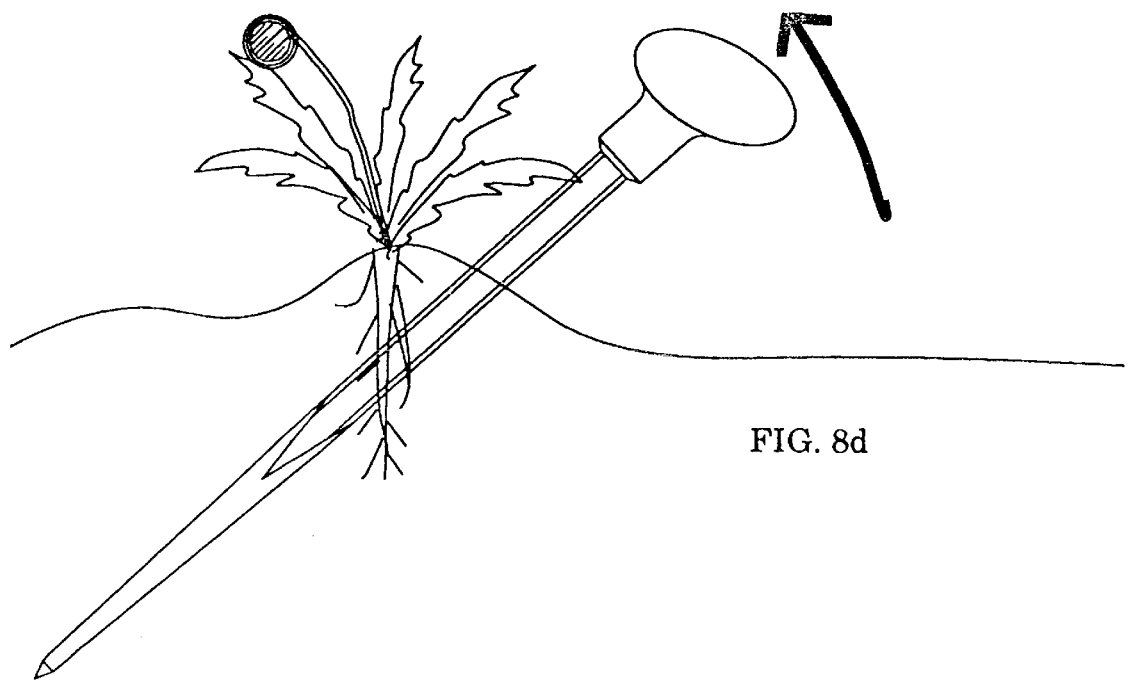

Next, the user quickly pushes the bluntly pointed 28 distal end of the tool shaft straight forward (see FIG. 8*c*) two or three inches into undisturbed, virgin earth (thus re-anchoring the angled tip cone 26 and returning the fulcrum point temporarily to the tip 26 end) and then immediately (fluidly and almost simultaneously) initiates an upward leveraging (see FIG. 8*d*) and lifting motion right under the plant to be removed. Since the soil adjacent to the root system has already been fractured and weakened once, the widened tip cone 26 design will usually remain initially anchored long enough that the thicker middle 14*b* and upper 14*c* two zones of the shaft will now powerfully further lift the entire target plant along with some of its surrounding soil and the adjacent lawn area. When properly executed (via angling this upward lifting motion slightly to either the left or right so as not to follow exactly the same pathway as the previous downward leveraging), this upward lifting motion will usually pulverize and loosen a great percentage of the soil around the root tendrils and release much of the root system as it often actually humps up the lawn and turf area around the weed.

Figure 8E:
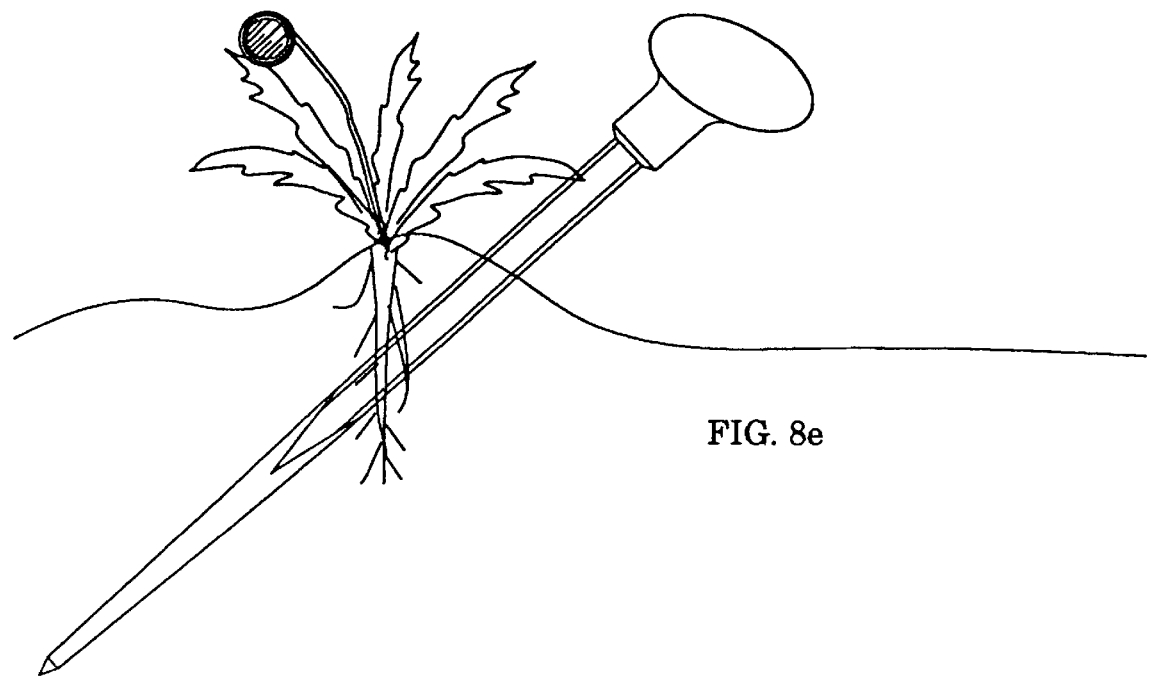

At this point, without removing or releasing the tool, the user should grasp (see FIG. 8*e*) the plant to be removed with the free hand under the leaves right at the top of the root system (i.e., on the root collar), but do not attempt to pull or extract the plant.

Figure 8F:
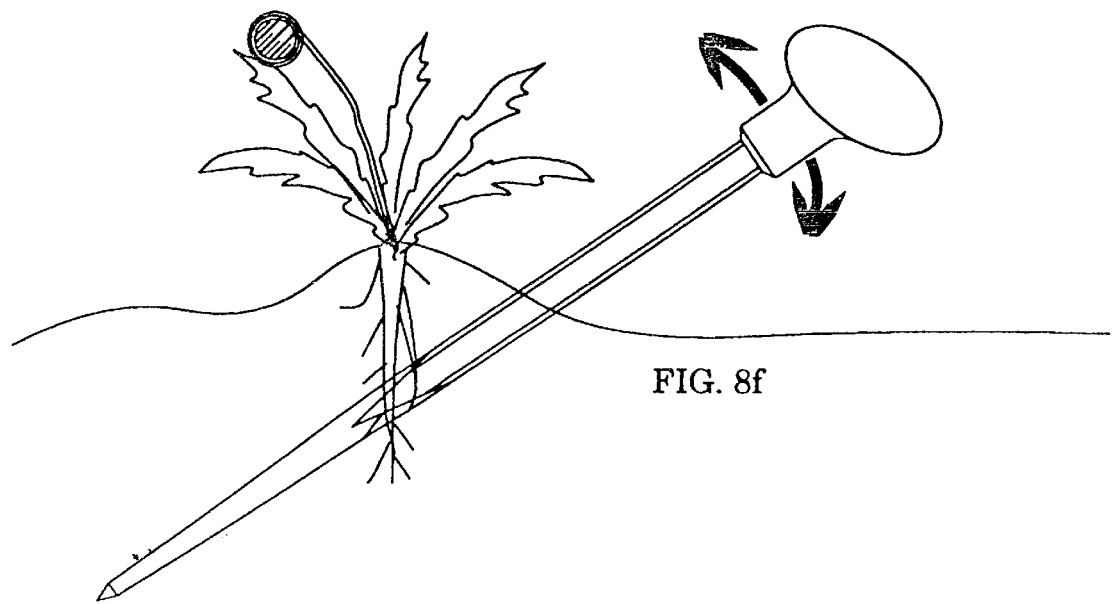
Figure 8G:
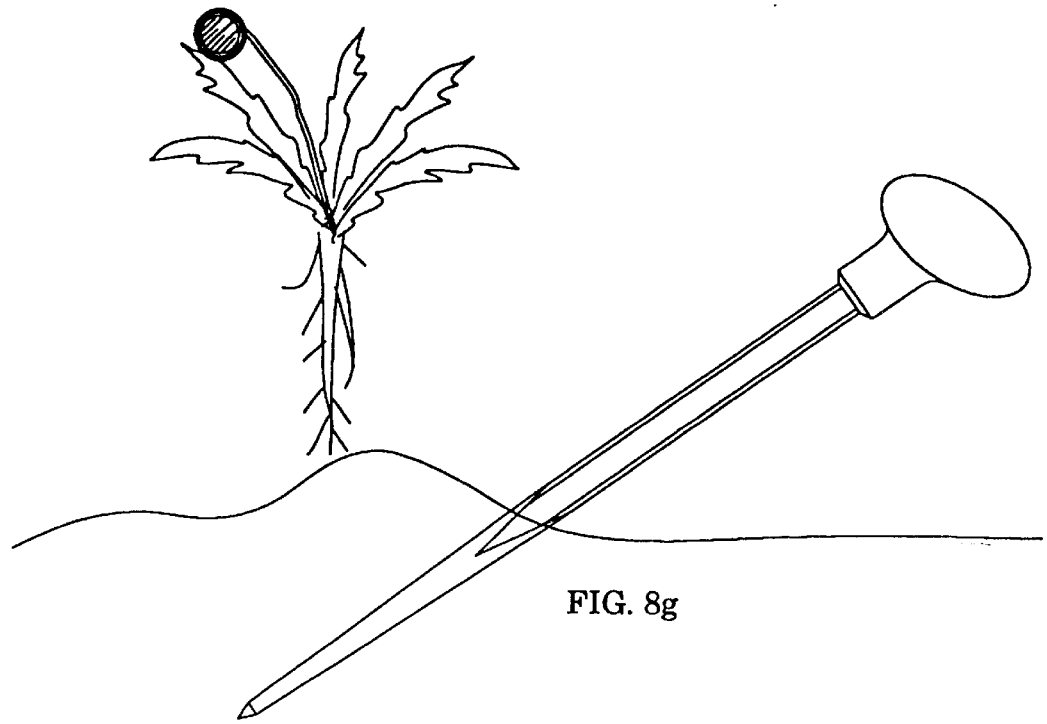
Figure 8:
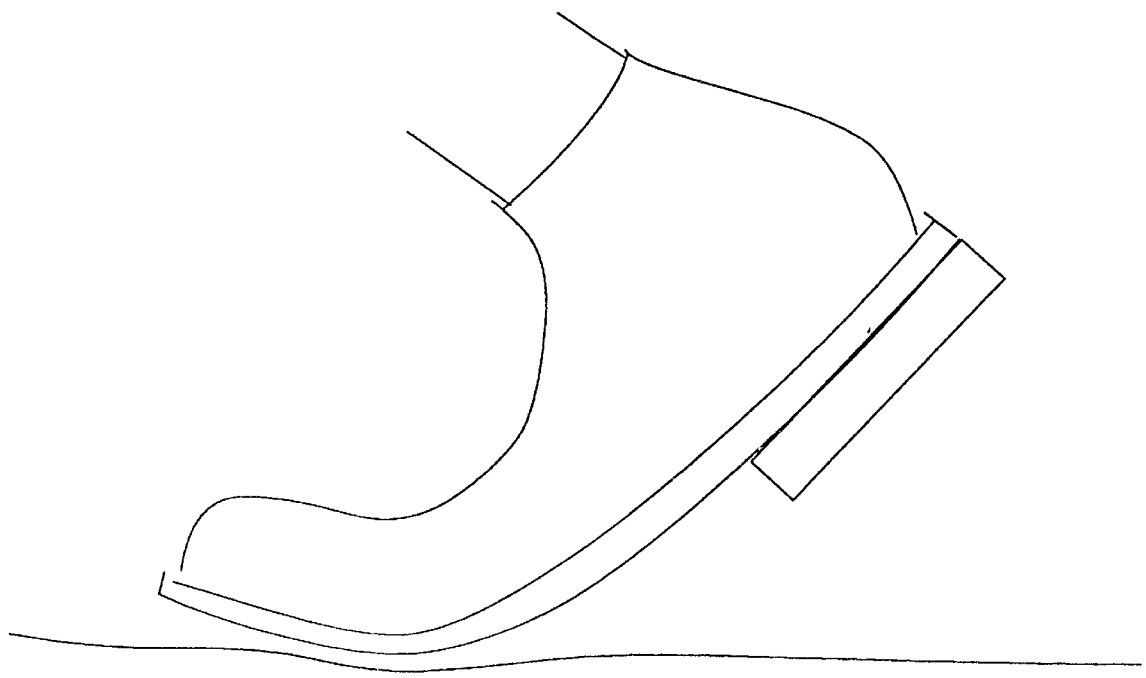

Next, the user should wiggle (see FIG. 8*f*) the tool from side to side and/or around in a small circle allowing the shaft, which is still positioned with the partially-loosened root system to pulverize more of the soil still holding on around the roots and root tendrils. When the roots are sufficiently released, the user's fingers will sense it, and the entire plant, roots and all, can be gently lifted (see FIG. 8*g*) out of the earth quite easily.

If, however, more persuasion is needed, the tool 10 can be reinserted at a ninety degree horizontal arc angle to the initial insertion and the above steps quickly repeated.

The soil moisture relative to the clay content is critical during these steps. The user should sprinkle first if the soil is too hard or brittle, or allow the soil to dry for a day or two if it is too wet or sticky. occasionally, the roots will be released, but the weed will still be completely entangled within the thick maze of turf and grass roots. In this case, insert the pointed end 28 of the tool 10 vertically downward parallel and right next to the plant's stem and tap root and lever the shaft 14 to one side tearing a gash in the turf which allows the user to more easily extract the weed. Then all the user has to do is step or press (see FIG. 8*h*) the disturbed sod back firmly on the freshly-loosened soil, and it is very difficult to tell where the weed was removed from.

It should be understood that many modifications may be made without departing from the basic spirit of the present invention. Accordingly, it will be appreciated by those skilled in the art that within the scope of the claims which follow, the invention may be practiced in ways other than have been specifically described herein.

What I claim:

1. An ergonomic handle for a tool comprising:
   a gripping surface having a generally egg-shaped profiles, and defining a major axis b—b, a minor axis c—c, and a horizontal axis d—d each defining a length, the length of said horizontal axis being at least 65% of the length of said major axis; and
   means for attaching said tool to said gripping surface.

2. The handle according to claim 1, wherein said gripping surface has multiple interrelated elliptical profiles.

3. The handle according to claim 2, wherein said gripping surface forms a generally egg-ellipse-shaped cross-section in a first plane and a flattened egg-ellipse-shaped cross-section in a second plane, said first plane and said second plane being substantially perpendicular to each other.

4. The handle according to claim 3, wherein said means for attaching said tool comprises a neck extending from said gripping surface and having a longitudinal axis a—a, and both said egg-ellipse-shaped cross sections having a common major axis intersecting with said neck's longitudinal axis at intersection point Y to form an acute angle with said neck's longitudinal axis.

5. The handle according to claim 4, wherein said acute angle measures from 40 to 70 degrees.

6. The handle according to claim 1, wherein the length of said minor axis is no more than 60% of the length of said major axis.

7. The handle according to claim 6, wherein the length of said minor axis is 57% of the length of said major axis.

8. An apparatus for removing weeds and associated roots from soil comprising:
   (a) an ergonomic handle having a gripping shape with multiple egg-shaped profiles, and defining a major axis and a minor axis having an intersection point;
   (b) means on said handle for attaching a tool thereto, said means for attaching defining a longitudinal axis which does not intersect said intersection point of said major and minor axis; and
   (c) an elongate shank operatively connected to said means for attaching.

9. The apparatus according to claim 8, wherein said gripping shape further comprises multiple interrelated egg-elliptical profiles.

10. The apparatus according to claim 9, wherein said gripping shape forms a generally widened egg-ellipse-shaped cross-section in a first plane and a generally flattened egg-ellipse-shaped cross-section in a second plane, said first plane and said second plane being substantially perpendicular to each other.

11. The apparatus according to claim 10, wherein said means for attaching said tool comprises a neck extending from said gripping shape and having said longitudinal axis, and both said egg-ellipse-shaped cross sections having in common said major axis that forms an acute angle with said longitudinal axis of said neck.

12. The apparatus according to claim 11, wherein said acute angle has a measurement in the range from 40 to 70 degrees.

13. The apparatus according to claim 12, wherein said neck and said gripping shape are integrally constructed together in a unitary, homogenous shape.

14. The apparatus according to claim 12, wherein said gripping shape is provided with surface gripping means for adjusting the friction between said gripping surface and a user's hand.

15. The apparatus according to claim 11, wherein said gripping shape is formed in a flattened compound egg-shaped ellipse for comfortably accommodating the human hand when applying heavy longitudinal force.

16. The apparatus according to claim 15, wherein said handle defines a rear/upper gripping shape, said rear/upper gripping shape being designed as a flattened compound egg-shaped ellipse for comfortably accommodating the natural shape of a human hand when applying heavy longitudinal force to a shaft, and which contains the following characteristics:
   (a) said major axis of the egg-shaped ellipse having a length and being normal to
   (b) a horizontal axis having a length that is 65% or greater than the length of the major axis,
   (c) and said minor axis having a length that is 55% or less than the length of the major axis, and is perpendicular to the horizontal axis, and
   (d) said major, minor and horizontal axes intersect at a central intersection point X within the grip egg-ellipse.

17. The apparatus according to claim 16, wherein said gripping shape is designed as a compound egg-shaped ellipse, and which contains the central intersection point X with the following characteristics:
   (a) said major, minor and horizontal axes are mutually perpendicular to each other, and
   (b) said longitudinal axis of said neck does not intersect with Point X.

18. The apparatus according to claim 16, wherein said gripping shape is designed as a compound egg-shaped ellipse, and which contains said major axis b—b which along its length:
   (a) intersects simultaneously with both said minor and horizontal axes at Point X, and
   (b) intersects with the longitudinal axis of said neck at Point Y, and
   (c) said Point Y intersects major axis b—b in the range of 33% above to 33% below said Point X, and
   (d) said Point Y and said Point X are mutually exclusive.

19. The apparatus according to claim 11, wherein said elongated shank includes a shank attachment end, said neck further comprises a recess shaped complementarily to said shank attachment end for receiving and gripping said attachment end therein.

20. The apparatus according to claim 19, wherein said neck further comprises a recess housed therein and adapted to receive said attachment end.

21. The apparatus according to claim 8, wherein said shank further comprises a transverse cross-section with generally rounded edges which have a radius of at least 0.0150 inches.

22. The apparatus according to claim 21, wherein said shank comprises a transverse cross-section with said rounded edges or corners having radii greater than 0.0150 inches.

23. The apparatus according to claim 8, wherein said shank further comprises a blunted point.

24. The apparatus according to claim 23, wherein said blunted point is provided with a point having a radius of curvature (R) at least 0.0150 inches.

25. The apparatus according to claim 23, wherein said shank further comprises a first steeply tapered triangular cone tip portion.

26. The apparatus according to claim 25, wherein said shank further comprises a second tapered portion adjacent to said triangular cone tip portion and having a slope angle less than said slope angle of said triangular cone tip portion, and followed by an untapered, parallel-edged shaft third portion.

27. The apparatus according to claim 25, wherein said shank further comprises a second tapered portion adjacent to said triangular cone tip and having a slope angle less than said slope angle of said triangular cone tip portion, a third tapered portion adjacent to said second tapered portion and having a slope angle less than said slope angle of said second tapered portion, and an untapered, parallel-edged shaft fourth portion adjacent to said third tapered portion.

28. The apparatus according to claim 27, wherein said shank is divided into three longitudinal zones including a distal tip zone, a middle zone, and a proximate handle zone.

29. The apparatus according to claim 28, wherein said shank is designed so that the maximum longitudinal cross-sectional area of the tapered distal tip zone is within a range of 25% to 75of the middle zone's 100% maximum longitudinal cross-sectional area.

30. The apparatus according to claim 23, wherein said shank further comprises a steeply tapered triangular cone tip portion, and having a slope angle at between 10 to 40 degrees from an axis a—a of the shank.

31. The apparatus according to claim 8, wherein said shank is constructed of a high-strength plastic.

32. An ergonomic handle for a tool comprising:

a gripping surface having a generally egg-shaped profile, and defining a major axis b—b, a minor axis c—c, and a horizontal axis d—d, said major and minor axis intersecting at a point X; and means for attaching said tool to said gripping surface, said means for attaching said tool defining a longitudinal axis a—a, said longitudinal axis a—a intersecting the major axis at a point Y, wherein point Y is displaced from point X.

33. The handle according to claim 32, wherein said major axis and said horizontal axis define a length, and the length of said horizontal axis is at least 65% of the length of said major axis.

* * * * *